United States Patent
Houlihan et al.

[15] 3,694,446

[45] Sept. 26, 1972

[54] 5-(SUBSTITUTED-BENZYL)-BENZOCYCLOHEPTENES AND -1-BENZOTHIEPINES

[72] Inventors: William J. Houlihan, 15 Raymald Road, Mountain Lakes, N.J. 07047; Jeffrey Nadelson, Troy Hills Village, 1480 Route 46, Parsippany, N.J. 07054

[22] Filed: Feb. 24, 1970

[21] Appl. No.: 13,799

[52] U.S. Cl.......260/268 BC, 260/239 B, 260/243 B, 260/247, 260/247.5 R, 260/241.7 A, 260/268 Z, 260/293.57, 260/293.62, 260/326.81, 260/327 B, 260/586 R, 424/250
[51] Int. Cl..............................................C07d 51/70
[58] Field of Search................................260/268 BC

[56] References Cited

UNITED STATES PATENTS

| | | |
|---|---|---|
| 3,142,682 | 7/1964 | de Stevens...........260/268 BC |
| 3,389,144 | 6/1968 | Mohrbacher et al. ...260/294.8 |
| 3,444,176 | 5/1969 | Mohrbacher...........260/294.8 |
| 3,519,629 | 7/1970 | Mohrbacher........260/268 BC |

OTHER PUBLICATIONS

Bertelli et al. abstracted in Chem. Abstr. Vol. 63, Col. 11456 (1965)

*Primary Examiner*—Donald G. Daus
*Attorney*—Gerald D. Sharkin, Frederick H. Weinfeldt, Robert S. Honor, Walter F. Jewell and Richard E. Vila

[57] ABSTRACT

5-(Substituted-benzyl)-benzocycloheptenes and -1-benzothiepines, e.g., 5-(2-methoxy-α- 4-methyl-1-piperazinyl benzyl)-5H-benzocyclohepten-5-ol are prepared by treating a substituted benzyl lithium compound with a benzocycloheptanone or -1-benzothiepinone. The compounds are useful as diuretics.

5 Claims, No Drawings

5-(SUBSTITUTED-BENZYL)-BENZOCYCLOHEPTENES BENZOTHIEPINES

This invention relates to substituted benzyl-benzocycloheptenes and -1-benzothiepines. More particularly, it relates to 5-(substituted-benzyl)-benzocycloheptenes and -1-benzothiepines, acid addition salts thereof, and processes for their preparation.

The compounds of this invention may be represented by the following structural formula:

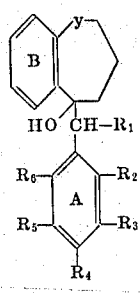

(I)

where
$R_1$ is hydrogen, phenyl, straight chain lower alkyl having one to four carbon atoms, e.g., methyl, ethyl, propyl or butyl,

where $R_8$ and $R_9$ together are $(CH_2)_x$ where $x$ is 4, 5, 6 or 7, or $R_8$ and $R_9$ together are

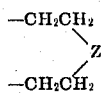

where Z is O, S or N-$R_{10}$, where $R_{10}$ is lower alkyl having one to four carbon atoms, e.g., methyl, ethyl, propyl, isopropyl, butyl or isobutyl;
$R_2$ is lower alkoxy having one to four carbon atoms, e.g., methoxy, ethoxy, propoxy, isopropoxy, butoxy or isobutoxy, or

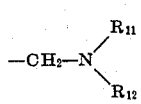

where $R_{11}$ and $R_{12}$ together are $(CH_2)x$ where $x$ is 4, 5, 6 or 7, or $R_{11}$ and $R_{12}$ together are

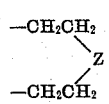

where Z has the above-stated significance;
$R_3$, $R_4$, $R_5$ and $R_6$ are, independently, hydrogen, halo, having an atomic weight of 19 to 36, lower alkyl having one to four carbon atoms, e.g., methyl, ethyl, propyl, isopropyl, butyl or isobutyl, or lower alkoxy having one to four carbon atoms, e.g., methoxy, ethoxy, propoxy, isopropoxy, butoxy or isobutoxy;
$y$ is $CH_2$ or S; and
provided that
1. no more than two of $R_3$, $R_4$, $R_5$ or $R_6$ can be other than hydrogen;
2. when $R_1$ is hydrogen, phenyl or lower alkyl, $R_2$ is

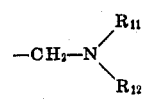

, $R_3$ is not lower alkoxy, $R_4$ is not halo, and $R_6$ is not halo;
3. when $R_1$ is

, $R_2$ is lower alkoxy, $R_3$ is not halo, $R_5$ is not halo, and $R_6$ is not lower alkyl;
4. when $R_5$ is halo, $R_3$ is not halo; and
5. when $R_6$ is halo, $R_4$ is not halo.

The process for preparing the compounds of formula (I) may be represented by the following reaction scheme A:

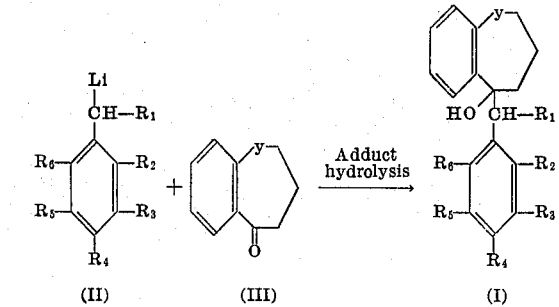

wherein $R_1$, $R_2$, $R_3$, $R_4$, $R_5$, $R_6$ and $y$ have the above-stated significance.

The compounds of formula (I) are prepared by treating a compound of formula (II) with a compound of formula (III) in an inert solvent such as diethyl ether, tetrahydrofuran, hexane, heptane, benzene or the like, in the presence of an inert gas, e.g., nitrogen, helium or argon and subjecting the reaction mixture to hydrolysis, preferably with aqueous ammonium chloride. The reaction may be carried out at a temperature of from $-50°$ to $+5°$ C., preferably from about $-50°$ to $-30°$ C. for about 1.5 to 48 hours, preferably about 2 to 4 hours. Compounds (III) is preferably added in inert solvent (as described above) to a cold (−50° to −30° C.) inert solvent solution of compounds (II). The solvents and the temperatures used are not critical.

The compounds of formula (I) may be prepared in acid addition salt form, such as the hydrochloride, by conventional methods, such as suspending the compound in alcohol or water and treating with the appropriate acid. When it is desired to convert such salts to the corresponding free bases, conventional techniques may be utilized, e.g., dissolution of the salt in water and precipitation using a base such as sodium hydroxide.

The compounds of formula (I) may be recovered using conventional recovery techniques such as crystallization.

The compounds of formula (II) may be prepared by the following reaction scheme B:

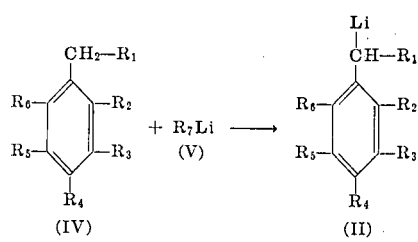

wherein $R_1$, $R_2$, $R_3$, $R_4$, $R_5$ and $R_6$ have the above-stated significance and $R_7$ is lower alkyl having one to four carbon atoms, e.g., methyl, ethyl, propyl, isopropyl, butyl, or isobutyl.

The compounds of formula (II) are prepared by treating a compound of formula (IV) with an organo lithium compound of formula (V) in an inert solvent (as described above) in the presence of an inert gas at a temperature of from 15° to 30° C., preferably from about 20° to 25° C., for about 15 to 48 hours, preferably about 22 hours. The solvents and the temperatures used are not critical.

Certain of the compounds of formulas (II), (III), (IV) and (V) are known and may be prepared according to methods disclosed in the literature. Those compounds of formulas (II), (III), (IV) and (V) not specifically disclosed are prepared according to analogous methods from known materials.

The compounds of formula (I) are useful because they possess pharmacological activity in animals. More particularly, the compounds are useful as diuretics as indicated by their activity in the rat given 25 mg/kg to 50 mg/kg of animal body weight of active material. The test method used is basically as described by Roy Aston, Toxicol and Appl. Pharmacol, 1,277, 1959. The compounds particularly useful as diuretics are the compounds of Example I, IV(9), VI and VII. For such usage, the compounds may be administered orally or parenterally.

The compound of Example I is furthermore useful as an anti-inflammatory agent, as indicated by activity in rats given 40 mg/kg of active compound orally and tested using the acute carrageenan-induced edema procedure substantially as described by Winter (Proc. Soc. Exp. Biol., 111, 544, 1962), and in the Guinea Pig Skin Tension Test substantially as described by Waksman et al. (J. Immunol. 85:403, 1960) and Schwartz et al. (J. Exp. Med. 116:679, 1962).

The compounds of formula (I) may be similarly administered in the form of their non-toxic pharmaceutically acceptable acid addition salts. Such salts possess the same order of activity as the free base, are readily prepared by reacting the base with an appropriate acid and accordingly, are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate, benzenesulfonate, maleate, malate, tartrate, methanesulfonate, cyclohexylsulfamate and the like.

The dosage administered for the diuretic use may vary depending on the particular compound employed, the therapy desired and the severity of the condition being treated. In general, satisfactory results are obtained when administered at a daily dosage of from about 7 milligrams to about 100 milligrams per kilogram of animal body weight, preferably given in divided doses, 2 to 4 times a day, or in sustained release form. For most larger mammals (e.g., primates) the total daily dosage is from about 500 milligrams to about 2,000 milligrams of the compound and the dosage forms suitable for internal use comprise from about 125 milligrams to about 1,000 milligrams of active compound in intimate admixture with a solid or liquid pharmaceutically acceptable carrier or diluent.

The dosage of active ingredient employed for the alleviation of inflammation may vary depending on the severity of the condition being treated. However, in general, satisfactory results are obtained when the compound of Example I is administered at a daily dosage of from about 4 milligrams to about 100 milligrams per kilogram of animal body weight, preferably given in divided doses two to four times a day, or in sustained release form. For most larger mammals (e.g., primates) the total daily dosage is from about 300 to about 1,500 milligrams. Dosage forms suitable for internal use comprise from about 75 to about 750 milligrams of the active compound, in intimate admixture with a solid or liquid pharmaceutically acceptable carrier or diluent.

A representative formulation suitable for oral administration is a capsule prepared by standard techniques which contain the following:

| Ingredients | Parts by Weight |
| --- | --- |
| 5-(2-methoxy-α-[4-methyl-1-piperazinyl]benzyl)-5H-benzocyclohepten-5-ol | 50 |
| Inert filler (starch, kaolin, lactose, etc.) | 250 |

EXAMPLE 1

5-(2-methoxy-α-[4-methyl-1-piperazinyl]benzyl)-5H-benzocyclohepten-5-ol

Step 1. 2-methoxy-α-(4-methyl-1-piperazinyl)benzyl lithium

To a flask equipped with a stirrer, dropping funnel, condenser and gas inlet tube maintained under a nitrogen atmosphere. There was added at room temperature 16.6 g (0.075 mole) of 2-methoxy-α-(4-methyl-1-piperazinyl) benzyl amine, 100 ml anhydrous diethyl ether and then dropwise in ca. 20 minutes 52.2 ml of 15 percent n-butyllithium (0.083 mole) in hexane. After standing at room temperature for ca. 22 hours, the intermediate compound 2-methoxy-α-(4-methyl-1-piperazinyl)benzyl lithium, was formed.

Step 2. 5-(2-methoxy-α-[4-methyl-1-piperazinyl]benzyl)-5H-benzocyclohepten-5-ol

The reaction flask containing the intermediate compound was immersed in a dryice-acetone bath and cooled to an internal temperature of −50° C. Stirring was initiated and a solution of 13.1 g (0.083 mole) of 6,7,8,9-tetrahydro-5H-benzocyclohepten-5-one in 50 ml of diethyl ether was added dropwise in ca 60 minutes, maintaining temperature below −30° C. Stirring between −30° and −50° C was continued for 2 hours and the mixture allowed to warm to 0° C. over 1 hour and then treated with 50 ml of saturated ammonium chloride. The layers were separated and the ether was washed twice with 50 ml of 2N HCl and the HCl solution washed once with 50 ml of ether. The acidic solution was cooled in ice and made basic by the addition of solid potassium hydroxide (pH=10) and the resulting mixture was extracted twice with 75 ml of methylene chloride. The methylene chloride was washed once with 50 ml water, dried over anhydrous Mg So₄ and evaporated in vacuo to give a yellow oil which was heated at 80° C under 0.1 mm vacuum to remove the excess starting amine. The residue was crystallized from ether to give 5-(2-methoxy-α-[4-methyl-1-piperazinyl]benzyl)-5H-benzocyclohepten-5-ol m.p. 127°–129° C, as a 80:20 mixture of diastereoisomers.

EXAMPLE II

Step 1. — Following the procedure of Example I, Step 1, and in place of 2-methoxy-α-(4-methyl-1-piperazinyl)benzylamine starting with;
 1. 2,3-dimethoxy-4-methyl-α-(4-methyl-1-piperazinyl)benzylamine
 2. 2,4-dimethoxy-3-methyl-α-(4-methyl-1-piperazinyl)benzylamine
 3. 2,3-dimethoxy-4-chloro-α-(4-methyl-1-piperazinyl)benzylamine
 4. 2-methoxy-3-methyl-4-chloro-α-(4-methyl-1-piperazinyl)benzylamine
 5. 2,6-dimethoxy-5-methyl-α-(4-methyl-1-piperazinyl)benzylamine
 6. 2,5-dimethoxy-6-chloro-α-(4-methyl-1-piperazinyl)benzylamine
 7. 2-methoxy-5-methyl-6-chloro-α-(4-methyl-1-piperazinyl)benzylamine
the following intermediate products are obtained:
 1. 2,3-dimethoxy-4-methyl-α-(4-methyl-1-piperazinyl)benzyl lithium
 2. 2,4-dimethoxy-3-methyl-α-(4-methyl-1-piperazinyl)benzyl lithium
 3. 2,3-dimethoxy-4-chloro-α-(4-methyl-1-piperazinyl)benzyl lithium
 4. 2-methoxy-3-methyl-4-chloro-α-(4-methyl-1-piperazinyl)benzyl lithium
 5. 2,6-dimethoxy-5-methyl-α-(4-methyl-1-piperazinyl)benzyl lithium
 6. 2,5-dimethoxy-6-chloro-α-(4-methyl-1-piperazinyl)benzyl lithium
 7. 2-methoxy-5-methyl-6-chloro-α-(4-methyl-1-piperazinyl)benzyl lithium Step 2. — Following the procedure of Example I, Step 2, and in place of 2-methoxy-α-(4-methyl-piperazinyl)benzyl lithium, using the corresponding intermediate product of Step 1 of this example, the following products are obtained:
 1. 5-(2,3-dimethoxy-4-methyl-α-[4-methyl-1-piperazinyl]benzyl)-5H-benzocyclohepten-5-ol
 2. 5-(2,4-dimethoxy-3-methyl-α-[4-methyl-1-piperazinyl[benzyl)-5H-benzocyclohepten-5-ol
 3. 5-(2,3-dimethoxy-4-chloro-α-[4-methyl-1-piperazinyl]benzyl)-5H-benzocyclohepten-5-ol
 4. 5-(2-methoxy-3-methyl-4-chloro-α-[4-methyl-1-piperazinyl]benzyl)-5H-benzocyclohepten-5-ol
 5. 5-(2,6-dimethoxy-5-methyl-α-[4-methyl-1-piperazinyl]benzyl)-5H-benzocyclohepten-5-ol
 6. 5-(2,5-dimethoxy-6-chloro-α-[4-methyl-1-piperazinyl]benzyl)-5H-benzocyclohepten-5-ol
 7. 5-(2-methoxy-5-methyl-6-chloro-α-[4-methyl-1-piperazinyl]benzyl)-5H-benzocyclohepten-5-ol

EXAMPLE III

Step 1. — Following the procedure of Example I, Step 1, and in place of 2-methoxy-α-(4-methyl-1-piperazinyl)benzylamine starting with;
 1. 2-methoxy-α-pyrrolidine benzylamine
 2. 2-methoxy-α-piperidino benzylamine
 3. 2-methoxy-α-hexamethyleneimino benzylamine
 4. 2-methoxy-α-heptamethyleneimino benzylamine
 5. 2-methoxy-α-morpholinobenzylamine
 6. 2-methoxy-α-thiomorpholinobenzylamine,
the following intermediate products are obtained:
 1. 2-methoxy-α-pyrrolidine benzyl lithium
 2. 2-methoxy-α-piperidino benzyl lithium
 3. 2-methoxy-α-hexamethyleneimino benzyl lithium
 4. 2-methoxy-α-heptamethyleneimino benzyl lithium
 5. 2-methoxy-α-morpholinobenzyl lithium
 6. 2-methoxy-α-thiomorpholinobenzyl lithium Step 2. — Following the procedure of Example I, Step 2, and in place of 2-methoxy-α-(4-methyl-piperazinyl)benzyl lithium, using the corresponding intermediate product of Step 1 of this example, the following products are obtained:
 1. 5-(2-methoxy-α-[pyrrolidino]benzyl)-5H-benzocyclohepten-5-ol
 2. 5-(2-methoxy-α-[piperidino]benzyl)-5H-benzocyclohepten-5-ol
 3. 5-(2-methoxy-α-[hexamethyleneimino]benzyl)-5H-benzocyclohepten-5-ol
 4. 5-(2-methoxy-α-[heptamethyleneimino]benzyl)-5H-benzocyclohepten-5-ol
 5. 5-(2-methoxy-α-[morpholino]benzyl)-5H-benzocyclohepten-5-ol
 6. 5-(2-methoxy-α-[thiomorpholino]benzyl)-5H-benzocyclohepten-5-ol

EXAMPLE IV

Step 1. — Following the procedure of Example I, Step 1, and in place of 2-methoxy-α-(4-methyl-1-piperazinyl)benzylamine, starting with;
 1. 2-methyl-α-pyrrolidino benzylamine
 2. 2-methyl-α-piperidino benzylamine
 3. 2-methyl-α-hexamethyleneimino benzylamine
 4. 2-methyl-α-heptamethyleneimino benzylamine
 5. 2-methyl-α-morpholino benzylamine
 6. 2-methyl-α-thiomorpholino benzylamine
 7. 2-ethyl-α-(4-methyl-1-piperazinyl)benzylamine 8. 2-benzyl-α-(4-methyl-1-piperazinyl)benzylamine
9. 2-methyl-α-(4-methyl-1-piperazinyl)benzylamine the following intermediate products are obtained:
1. 2-methyl-α-pyrrolidino benzyl lithium
2. 2-methyl-α-piperidino benzyl lithium
3. 2-methyl-α-hexamethyleneimino benzyl lithium
4. 2-methyl-α-heptamethyleneimino benzyl lithium
5. 2-methyl-α-morpholino benzyl lithium
6. 2-methyl-α-thiomorpholino benzyl lithium
7. 2-ethyl-α-(4-methyl-1-piperazinyl)benzyl lithium
8. 2-benzyl-α-(4-methyl-1-piperazinyl)benzyl lithium
9. 2-methyl-α-(4-methyl-1-piperazinyl)benzyl lithium Step 2. — Following the procedure of Example I, Step 2 and in place of 2-methyl-α-(4-methyl-piperazinyl)benzyl lithium, using the corresponding intermediate product of Step 1 of this example, the following products are obtained:

1. 6,7,8,9-tetrahydro-5-[2-(pyrrolidinomethyl)benzyl]-5H-benzocyclohepten-5-ol
2. 6,7,8,9-tetrahydro-5-[2-(piperidinomethyl)benzyl]5H-benzocyclohepten-5-ol
3. 6,7,8,9-tetrahydro-5-[2-(hexamethyleneiminomethyl)benzyl]-5H-benzocyclohepten-5-ol
4. 6,7,8,9-tetrahydro-5-[2-(heptamethyleneiminomethyl)benzyl]-5H-benzocyclohepten-5-ol
5. 6,7,8,9-tetrahydro-5-[2-(morpholinomethyl)benzyl]5H-benzocyclohepten-5-ol
6. 6,7,8,9-tetrahydro-5-[2-(thiomorpholinomethyl)benzylh-5H-benzocyclohepten-5-ol
7. 6,7,8,9-tetrahydro-5-[α-methyl-2-(4-methyl-1-piperazinyl-methyl)benzyl]-5H-benzocyclohepten-5-ol
8. 6,7,8,9-tetrahydro-5-[α-phenyl-2-(4-methyl-1-piperazinyl-methyl)benzyl]-5H-benzocyclohepten-5-ol
9. 6,7,8,9-tetrahydro-5-[2-(4-methyl-1-piperazinylmethyl)benzyl]-5H-benzocyclohepten-5-ol m.p. 133°–134° C.

EXAMPLE V

Step 1 — Following the procedure of Example I, Step 1, and in place of 2-methoxy-α-(4-methyl-1-piperazinyl)benzylamine, starting with;
1. 2-methyl-6-chloro-5-methoxy-α-(4-methyl-1-piperazinyl)benzylamine
2. 2,5-dimethyl-6-chloro-α-(4-methyl-1-piperazinyl)benzylamine
3. 2,6-dimethyl-5-methoxy-α-(4-methyl-1-piperazinyl)benzylamine
4. 2,3-dimethyl-4-chloro-α-(4-methyl-1-piperazinyl)benzylamine
5. 2,4-dimethyl-3-methoxy-α-(4-methyl-1-piperazinyl)benzylamine
6. 2,3-dimethyl-4-methoxy-α-(4-methyl-1-piperazinyl)benzylamine the following intermediate products are obtained:

1. 2-methyl-6-chloro-5-methoxy-α-(4-methyl-1-piperazinyl)benzyl lithium
2. 2,5-dimethyl-6-chloro-α-(4-methyl-1-piperazinyl)benzyl lithium
3. 2,6-dimethyl-5-methoxy-α-(4-methyl-1-piperazinyl)benzyl lithium
4. 2,3-dimethyl-4-chloro-α-(4-methyl-1-piperazinyl)benzyl lithium
5. 2,4-dimethyl-3-methoxy-α-(4-methyl-1-piperazinyl)benzyl lithium
6. 2,3-dimethyl-4-methoxy-α-(4-methyl-1-piperazinyl)benzyl lithium Step 2. — Following the procedure of Example 1, Step 2, and in place of 2-methoxy-α-(4-methyl-piperazinyl)benzyl lithium, using the corresponding intermediate product of Step 1 of this example, the following products are obtained:

1. 6,7,8,9-tetrahydro-5-[2-(4-methyl-1-piperazinylmethyl)3-chloro-4-methoxybenzyl]-5H-benzocyclohepten-5-ol
2. 6,7,8,9-tetrahydro-5-[2-(4-methyl-1-piperazinylmethyl)-3-chloro-4-methylbenzyl]-5H-benzocyclohepten-5-ol
3. 6,7,8,9-tetrahydro-5-[2-(4-methyl-1-piperazinylmethyl)-3-methyl-4-methoxybenzyl]-5H-benzocyclohepten-5-ol
4. 6,7,8,9-tetrahydro-5-[2-(4-methyl-1-piperazinylmethyl)-5-chloro-6-methylbenzyl]-5H-benzocyclohepten-5-ol
5. 6,7,8,9-tetrahydro-5-[2-(4-methyl-1-piperazinylmethyl)-5-methyl-6-methoxybenzyl]-5H-benzocyclohepten-5-ol
6. 6,7,8,9-tetrahydro-5-[2-(4-methyl-1-piperazinylmethyl)-5-methoxy-6-methylbenzyl]-5H-benzocyclohepten-5-ol

EXAMPLE VI

Step 1. — Following the procedure of Example I, Step 1 and in place of 2-methoxy-α-(4-methyl-1-piperazinyl)benzylamine, starting with;
2-methyl-α-(4-methyl-1-piperazinyl)benzylamine,
the intermediate product 2-methyl-α-(4methyl-1-piperazinyl)benzyl lithium is obtained.

Step 2. — Following the procedure of Example 1, Step 2, and in place of 2-methoxy-α-(4-methyl-piperazinyl)benzyl lithium, using 2-methyl-α-(4-methyl-1-piperazinyl)benzyl lithium, and in place of 6,7,8,9-tetrahydro-5H-benzocyclohepten-5-one using 3,4-dihydro-1-benzothiepin-5-(2H)-one, the product 2,3,4,5-tetrahydro-5-[2-(4-methyl-1-piperazinylmethyl)benzyl]-1-benzothiepin-5-ol; mp 178.5°–179° C. is obtained.

EXAMPLE VII

Using the intermediate compound 2-methoxy-α-(4-methyl-piperazinyl) benzyl lithium of Example 1, Step 1, and following the procedure of Example 1, Step 2, using 3,4-dihydro-1-benzothiepin-5-(2H)-one in place of 6,7,8,9-tetrahydro-5H-benzocyclohepten-5-one, the product, 2,3,4,5-tetrahydro-5-[2-methoxy-α-(4-methyl-1-piperazinyl)benzyl]-1-benzothiepin-5-ol; mp 194°–195.5° C. is obtained.

What is claimed is:
1. A compound of the formula

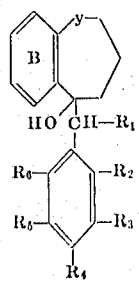

where
R₁ is hydrogen, phenyl, straight chain lower alkyl having one to four carbon atoms,

where R₈ and R₉ together are

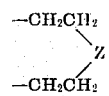

where
Z N-R₁₀, where R₁₀ is lower alkyl having one to four carbon atoms;
R₂ is lower alkoxy having one to four carbon atoms,

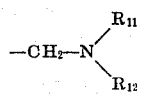

where R₁₁ and R₁₂ together are

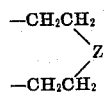

where Z has the above-stated significance;
R₃, R₄, R₅ and R₆ are, independently, hydrogen, halo, having an atomic weight of 19 to 36, lower alkyl having one to four carbon atoms,
y is CH₂ or S;
or a pharmaceutically acceptable acid addition salt thereof, provided that
1. no more than two of R₃, R₄, R₅ or R₆ can be other than hydrogen;
2. when R₁ is hydrogen, phenyl or lower alkyl, R₂ is

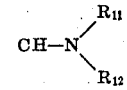

, R₃ is not lower alkoxy, R₄ is not halo, and R₆ is not halo; and R₆ is not halo;
3. when R₁ is

, R₂ is lower alkoxy, R₃ is not halo, R₅ is not halo, and R₆ is not lower alkyl;
4. when R₅ is halo, R₃ is not halo; and
5. when R₆ is halo, R₄ is not halo.

2. The compound of claim 1 which is 5-(2-methoxy-α-[4-methyl-1-piperazinyl]benzyl)-5H-benzocyclohepten-5-ol.

3. The compound of claim 1 which is 6,7,8,9-tetrahydro-5-[2-(4-methyl-1-piperazinylmethyl)benzyl]-5H-benzocyclohepten-5-ol.

4. The compound of claim 1 which is 2,3,4,5-tetrahydro-5-[2-(4-methyl-1-piperazinylmethyl)benzyl]-1-benzothiepin-5-ol.

5. The compound of claim 1 which is 2,3,4,5-tetrahydro-5-[2-methoxy-α-(4-methyl-1-piperazinyl)benzyl]-1-benzothiepin-5-ol.

* * * * *